(12) United States Patent
Freitag et al.

(10) Patent No.: US 7,775,266 B2
(45) Date of Patent: Aug. 17, 2010

(54) HEAT EXCHANGER, ESPECIALLY FOR AN INTERCOOLER

(75) Inventors: Marius Freitag, Stuttgart (DE); Georg Kämmler, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 77 days.

(21) Appl. No.: 11/632,118

(22) PCT Filed: Jul. 1, 2005

(86) PCT No.: PCT/EP2005/007092

§ 371 (c)(1),
(2), (4) Date: Jul. 20, 2007

(87) PCT Pub. No.: WO2006/005449

PCT Pub. Date: Jan. 19, 2006

(65) Prior Publication Data

US 2007/0267184 A1    Nov. 22, 2007

(30) Foreign Application Priority Data

Jul. 12, 2004  (DE) .................. 10 2004 033 784

(51) Int. Cl.
F28F 9/02 (2006.01)
(52) U.S. Cl. .................. 165/173; 165/158; 165/162
(58) Field of Classification Search .................. 165/158, 165/159, 162, 173, 174
See application file for complete search history.

(56) References Cited

FOREIGN PATENT DOCUMENTS

| DE | 197 57 034 A1 | 6/1999 |
|---|---|---|
| DE | 198 57 435 A1 | 6/1999 |
| DE | 200 16 331 U1 | 2/2002 |
| DE | 100 57 190 A1 | 5/2002 |
| EP | 0 735 337 A1 | 10/1996 |
| EP | 1 273 868 A2 | 1/2003 |
| FR | 2 614 980 A1 | 11/1988 |
| FR | 2 742 528 A1 | 6/1997 |
| FR | 2 742 533 A1 | 6/1997 |

*Primary Examiner*—Teresa J Walberg
(74) *Attorney, Agent, or Firm*—Foley & Lardner LLP

(57) ABSTRACT

A heat exchanger, especially an intercooler for a motor vehicle. The heat exchanger comprises a box, a chamber in which a flowing medium is distributed and/or accumulated, a bundle of tubes, tubes, a tube base, openings, a housing lid, two lateral walls, a stabilizing element, a first receiving element, a first transmission element, a second receiving element, a second transmission element, a force transducing element and a flow guide surface.

20 Claims, 6 Drawing Sheets

HEAT EXCHANGER, ESPECIALLY FOR AN INTERCOOLER

The present invention relates to a heat exchanger, especially an intercooler for a motor vehicle, with a stabilizing element.

BACKGROUND

In order to achieve an increase in the power output of an internal combustion engine, the air to be admitted to the combustion can be compressed, for example with a turbocharger, before it is admitted to the combustion chambers of the internal combustion engine. However, the compression of the air results at the same time in a heating of the latter that is disadvantageous for an optimum course of the combustion process. For example, it can cause premature ignition or an increased emission of nitrogen oxides. In order to avoid the disadvantageous consequences of the combustion of the supplied superheated air, a heat exchanger designed as an intercooler is installed downline of a turbocharger, with which heat exchanger the compressed air can be cooled to an admissible temperature before its combustion.

An intercooler is described, for example, in DE 197 57 034 A1. In the heat exchanger described there, the hot air is admitted to a first accumulating duct of the heat exchanger where it is distributed and flows into flat tubes that end in the accumulating duct. The flat tubes are arranged alongside one another, and with the side surfaces containing the long sides of their cross-section arranged parallel to one another, and form a flow path through which cooling air is guided. Cooling ribs are arranged between the flat tubes in the flow path and ensure an effective heat exchange between the flat tubes and the cooling air current. After passing through the cooling air current, the flat tubes end in a second accumulating duct that supplies the incoming cooled compressed charge air to the combustion process in the engine.

SUMMARY

With such intercoolers, the accumulating ducts are usually limited by a tube bottom and walls of at least one box that are forced apart when charged with compressed air due to the high pressure. High demands are hereby made on the joint between the tube bottom and the box walls, both with respect to its air tightness and with respect to its mechanical strength.

In order to counter a tendency of the box walls to move apart, tie rods, for example, are used that connect pairs of opposite box walls with one another, thereby stiffening the box. In order to absorb the occurring tensile forces, however, the tie rods have to exhibit a certain minimum thickness. As a result, the flow conditions of the air to be cooled and hence the pressure loss caused by the intercooler are negatively influenced. With plastic boxes, furthermore, often expensive and/or delicate injection molds are necessary in order to be able to produce boxes with tie rods.

The object of the invention is to provide a heat exchanger in which a high mechanical strength can be achieved with only a slightly increased or possibly even a reduced pressure loss.

A heat exchanger according to the invention comprises at least one box with at least one chamber for distribution and/or accumulation of a flowing medium and at least one tube bundle of tubes in communicating connection with the at least one chamber. The box consists of a tube bottom with openings into which the tubes of the tube bundle can be inserted, and a housing lid with at least two side walls that are connected to one another by means of at least one stabilizing element. The at least one stabilizing element advantageously comprises at least one first and one second force transmission element, whereby a first force transmission element can be received in a first receiving element of a side wall of the housing lid and a second force transmission element engages in a second receiving element of the tube bottom.

A tube bundle in the sense of the invention is formed by adjacent tubes. The tubes can be arranged in one row or in several rows.

Forces acting on the two side walls of the housing lid, for example compressive forces, that force the side walls apart are transmitted by the at least one first force transmission element at least partially to the at least one stabilizing element. Forces acting on the at least one stabilizing element are transmitted by the at least one second force transmission element to the tube bottom. In this way, forces acting on the side walls are absorbed partially by the side walls proper, partially by the stabilizing element and partially by the tube bottom, whereby the respective proportions of the force absorption can differ widely.

The force that is absorbed by the stabilizing element is reduced in particular by the force absorption of the tube bottom, so that a relatively low thickness of the stabilizing element is sufficient to stabilize the box.

The flow conditions in the at least one chamber within the box are thus influenced relatively little by the stabilizing element, so that the pressure loss is increased only slightly or not at all.

According to an advantageous embodiment, the at least one first force transmission element is formed in one piece with the at least one second force transmission element so that a force transmission from a side wall of the box to the tube bottom is ensured in a simple manner.

According to a preferred embodiment, the at least one stabilizing element has at least one force transducing element that creates a connection between two side walls to measure a force between these two side walls. In order not to hinder a flow of a medium from the at least one chamber into the tubes of the tube bundle or vice versa, the at least one force transducing element is essentially arranged between two adjacent openings of the tube bottom. This means that the openings are not covered by the force transducing element.

A force transducing element is preferably arranged in each gap between two tube bottom openings. According to one embodiment, however, only some of the gaps are fitted with a force transducing element, for example when using identical stabilizing element arrangements for different heat exchangers with different numbers of tubes.

According to one preferred further development of the invention, the force transducing element is designed to be flexible so that the stabilizing element absorbs only some of the forces acting on the side walls. This ensures that the side walls proper absorb some of the forces acting on them. This provides a more uniform distribution of the forces between the various components so that overall an adequate stability of the box is achieved with relatively low material thicknesses.

The at least one force transducing element is particularly preferably formed in one piece with at least one first and/or at least one second force transmission element. The at least one stabilizing element can therefore be manufactured at relatively low cost.

According to an advantageous embodiment of a heat exchanger according to the invention, the at least one stabilizing element has at least one flow guide surface. The flow guide surface serves to effectively avoid or reduce turbulence in the medium flowing into or out of the tubes of the tube bundle by covering depressions such as, for example, troughs, grooves or intersections and covering or compensating elevations such as, for example, projections, corners or edges. For this purpose the at least one flow guide surface is essentially connected at least in certain areas to at least one inner or outer surface of a wall of a tube of the tube bundle and/or to at least one inner surface of an edge of an opening in the tube bottom.

A connection of the flow guide surface to an inner surface is hereby particularly advantageous from a fluidic point of view. A connection of the flow guide surface to outer surfaces of a tube wall is advantageous particularly when some tube ends could protrude further over openings in the tube bottom than others due to manufacturing tolerances. The further protruding tube ends then do not collide with the flow guide surfaces. According to a further embodiment, the tube ends are flared and possibly in contact with the flow guide surfaces via the outer surfaces of their walls.

The at least one flow guide surface is particularly preferably curved towards the inner or outer surface of a tube wall or towards the inner surface of the edge of an opening. In some cases, this further reduces a flow resistance created by the stabilizing element.

According to an advantageous embodiment, the stabilizing element has a rotationally symmetrical form, whereby the preferably dual symmetry axis is oriented particularly preferably parallel to a tube longitudinal axis of the tube bundle. This results in an increased production reliability because proper arrangement, in particular insertion, of the stabilizing element is facilitated during assembly of the heat exchanger, as the stabilizing element is also arranged with a desired orientation after a rotation through 180°.

According to a preferred embodiment, the heat exchanger has two stabilizing elements that are connected to one another by means of at least one connecting element. This permits a common and hence simplified assembly of several stabilizing elements. All the stabilizing elements are particularly advantageously joined together to form a frame so that only one single additional part has to be installed.

The connecting element is preferably arranged in the area of a side wall of the housing lid, and hence not over an opening in the tube bottom. This means that the openings in the tube bottom are not covered by the connecting element.

The connecting element is preferably designed to be flexible due to its material and/or its form. This permits a compensation of manufacturing tolerances in the distance between two stabilizing elements. Furthermore, a deformable connecting element is advantageous because a storage or transport of several stabilizing elements is thereby simplified and these can be transported, for example, on rollers or similar devices.

The at least one connecting element is preferably formed in one piece with at least one adjacent stabilizing element. All the stabilizing and connecting elements are particularly preferably formed together in one piece, thus permitting a simplified and hence less expensive manufacture.

The connecting element preferably has considerably smaller dimensions than the stabilizing element. This can in some cases permit a better deformability of the connecting element and/or a simplified installation of the stabilizing elements.

According to one advantageous embodiment, the housing lid has at least one reinforcing rib. The reinforcing rib serves to improve the force absorption and hence to stabilize the housing lid. Arrangement of a first receiving element for a first force transmission element in the area of the reinforcing rib allows a favorable interaction between the stabilizing element and the reinforcing rib by enabling forces that are not absorbed by the stabilizing element to be dissipated via the reinforcing rib. In some cases this type of arrangement can help avoid or at least reduce localized accumulations of material in the housing lid.

A wall base of the housing lid with large dimensions is advantageous for additional stabilization. A wall base with a thickness $M>4$ mm and/or a height $L>4$ mm has proved to be favorable.

A further object of the invention derives in some cases from the fact that a housing lid made from plastic, particularly after production by an injection molding method, often has to be provided with a spreader frame. This is intended to prevent distortion of the box form, particularly in the area of its wall base. The spreader frame must, however, be removed again before installation of the box.

The object of reducing the distortion of the housing lid in a simpler manner is achieved, in particular with a heat exchanger according to the preamble of claim 1, by a stabilizing element that absorbs distortion stress forces, in other words normally compressive forces, and remains in the box. The stabilizing element then takes on the role of a lost spreader frame. This means that under certain circumstances, the stabilizing element absorbs compressive forces during manufacture of the heat exchanger and tensile forces during operation of the heat exchanger. The housing lid is furthermore stabilized on the tube bottom during assembly so that the manufacturing reliability is assured during this manufacturing step

BRIEF DESCRIPTION OF THE DRAWINGS

The invention is described in greater detail below by reference to embodiments and to the drawings, in which.

DETAILED DESCRIPTION

Figure 1:
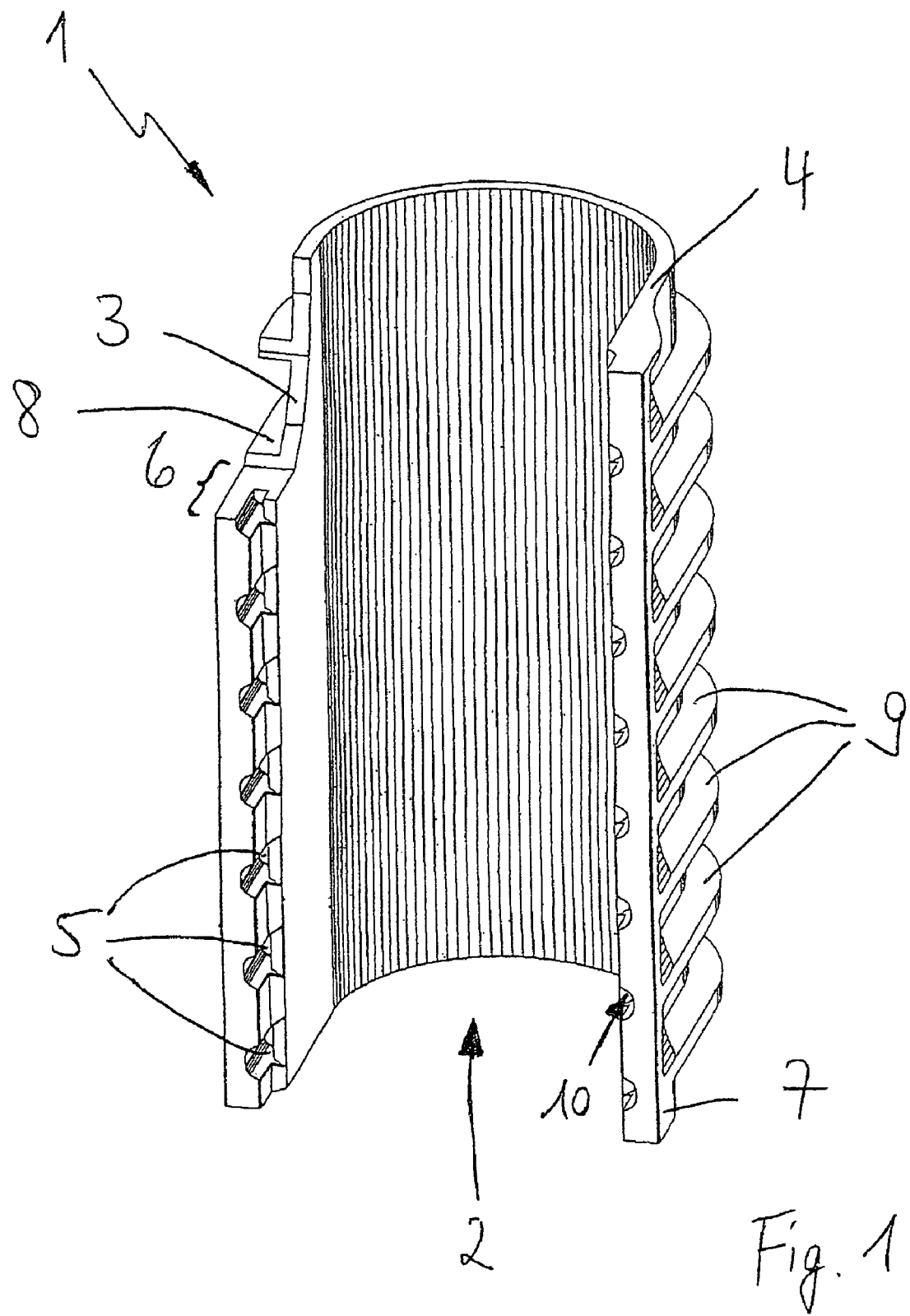
FIG. 1 shows a housing lid of a box of a heat exchanger.

FIG. 1 shows a housing lid 1 of a box of a heat exchanger according to the present invention. The housing lid 1 together with a tube bottom (not illustrated) encloses a chamber 2 that is provided, for example, for accumulation or distribution of a flowing medium. On its longitudinal sides the housing lid has side walls 3, 4 and on its end sides end walls (not illustrated). Located in the edge areas 6, 7 of the side walls 3, 4 are first receiving elements 5, 10 that are suitable for the positive mounting of force transmission elements (not illustrated). The housing lid 1 is stabilized in its form by reinforcement ribs 8, 9 in the area of each of which the first receiving elements 5 are arranged.

Figure 2:
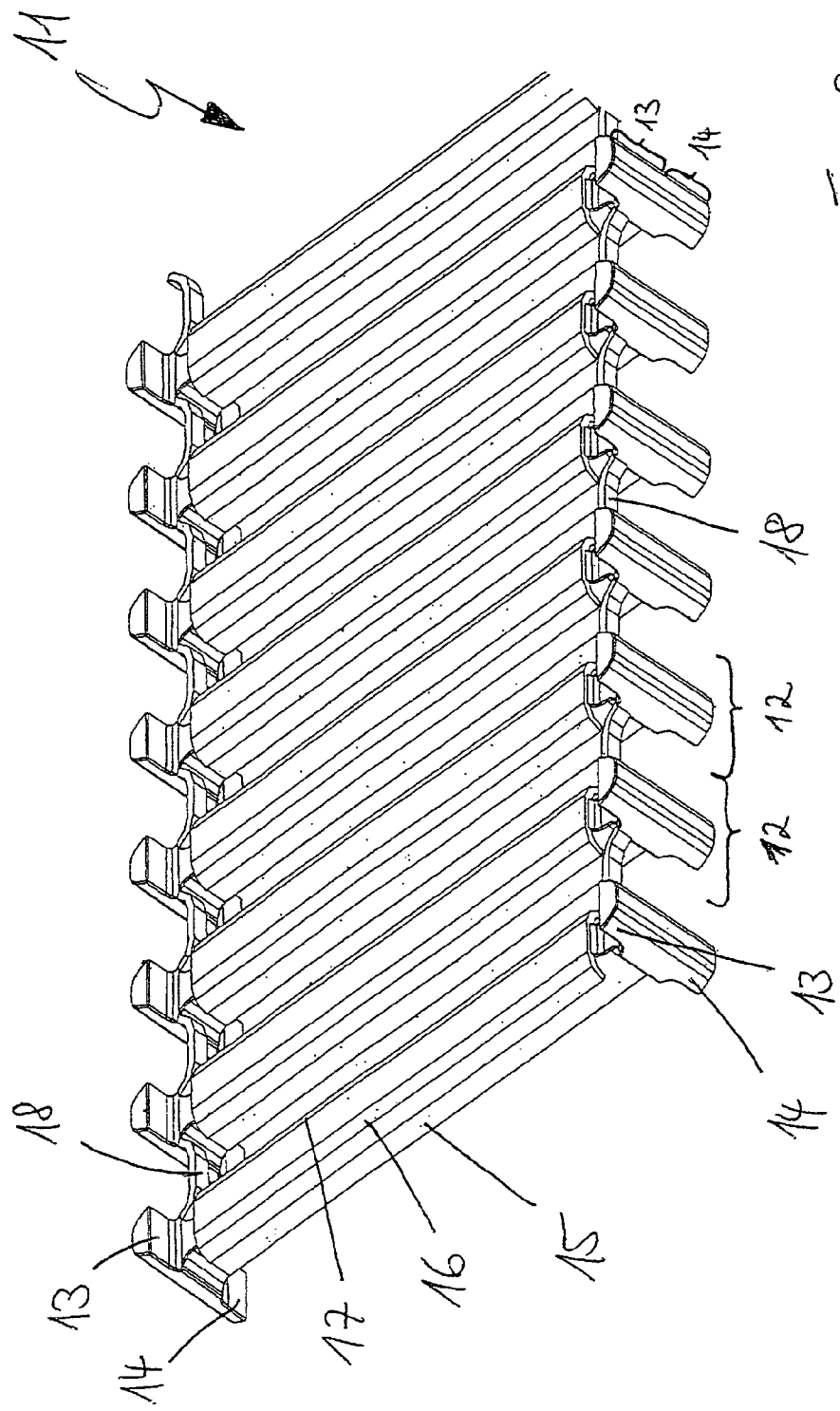
FIG. 2 shows stabilizing elements of a heat exchanger box.

FIG. 2 shows a spreader frame 11 with stabilizing elements 12 for a heat exchanger box (not illustrated in further detail). Each stabilizing element 12 has two first force transmission elements 13 that are suitable for positive fitting into first receiving elements of a housing lid (not illustrated). Furthermore, each stabilizing element comprises two second force transmission elements 14 provided for engagement in second receiving elements of a tube bottom (also not illustrated).

Each first force transmission element 13 is formed in one piece with a second force transmission element 14. In each case two one-piece pairs of force transmission elements 13, 14 of this kind are connected to one another by a force transducing element 15 also formed in one piece and suitable for absorbing tensile and/or compressive forces in particular along its longitudinal direction. The double-T-shaped cross section of the stabilizing elements thus serves at the same time to transmit force via force transmission elements 13, 14 that form the end beams of the double-T shape, and to absorb force via force transducing elements 15 that form the middle section of the double-T shape.

Due to its material, for example plastic, the force transducing element 15 is designed to be flexible so that tensile and/or compressive forces are only partially absorbed, thereby resulting in a partial relief of the spreader frame 11. The stabilizing elements 12 furthermore comprise flow guide surfaces 16, 17 that are again formed in one piece with the force transducing elements 15. The function of the flow guide surfaces 16, 17 is described further below.

The stabilizing elements 12 are each connected in pairs in one piece via connecting elements 18 that here are formed as narrow webs. The connecting elements 18 are designed to be flexible in such a way that the whole spreader frame 11 can be rolled up and can thus be easily transported. Clamping frames of any size can be taken from an endless roll in particular by simply cutting through two opposite connecting elements 18. Due to their curved form, the connecting elements 18 are designed to be flexible in their longitudinal direction so that the distance between in each case two stabilizing elements 12 can be adapted to the distance between in each case two receiving elements in the housing lid (not illustrated) during assembly.

Due to the dual rotational symmetry of the stabilizing elements 12 and of the whole spreader frame 11, the spreader frame 11 is imaged on itself by a rotation through 180° and is functional irrespective of such a rotation, resulting in an increased production reliability.

Figure 3:
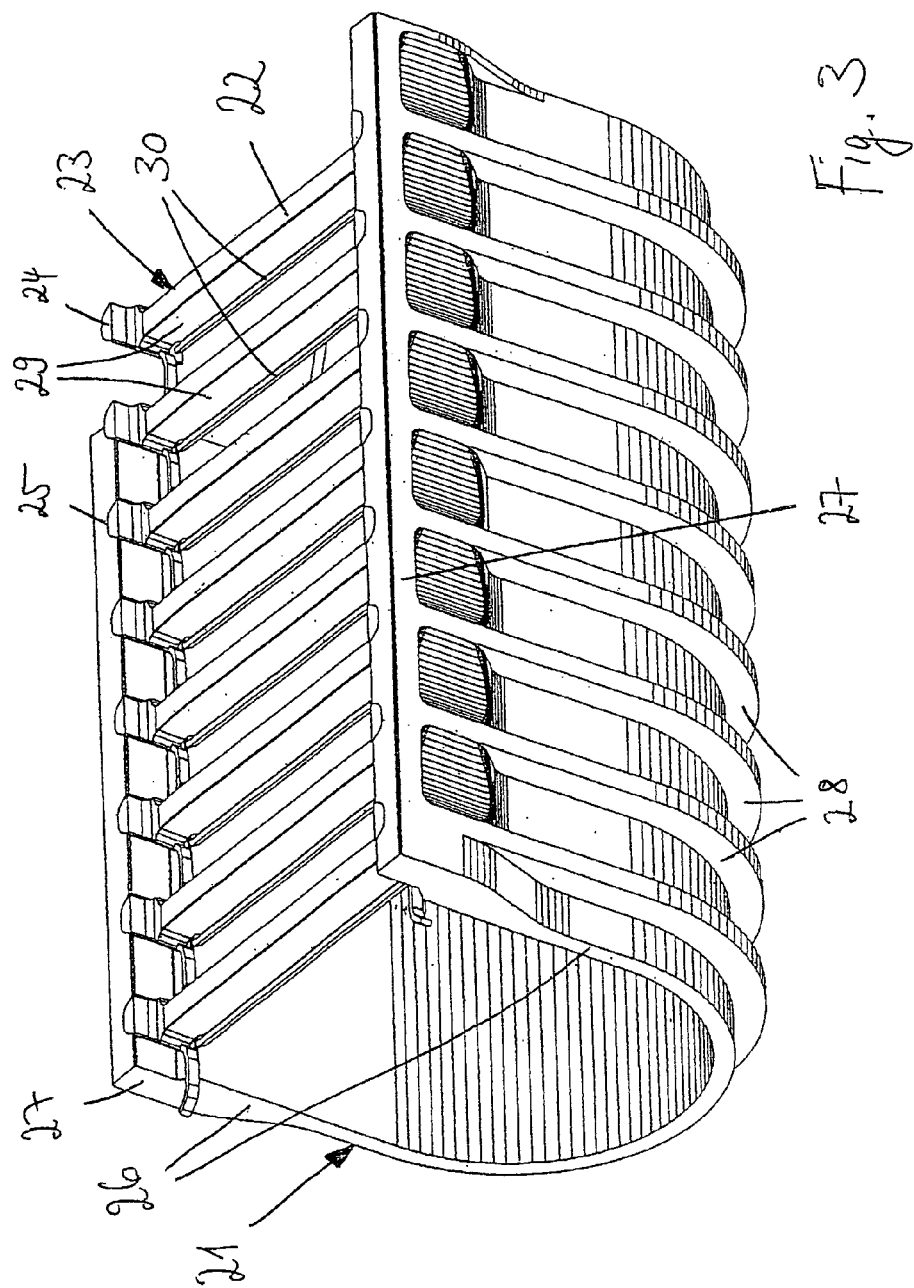
FIG. 3 shows a housing lid with installed stabilizing elements.

FIG. 3 shows a housing lid 21 with a spreader frame 23 consisting of stabilizing elements 22. The stabilizing elements 22, as with the stabilizing elements 12 from FIG. 2, comprise first force transmission elements that are held in first receiving elements of the housing lid 21 and are therefore not visible in FIG. 3. Second force transmission elements 24 are held in recesses 25 of the housing lid 21, with the recesses 25 being formed as an extension to the first receiving elements. The edge areas of the side walls 26 of the housing lid 21 are thus complemented by the force transmission elements of the stabilizing elements 23 to form complete wall bases 27.

The housing lid 21 and/or the spreader frame 23 are preferably made of plastic, in particular of PPS. The spreader frame 23 is already preferably laid into the housing lid 21 shortly after demolding of the lid, in particular from an injection mold, so that distortion of the form of the housing lid 21 during its cooling is suppressed. At the same time the spreader frame 23 that then acts as a lost spreader frame may, under certain circumstances, be gripped or fixed by the resulting distortion forces and is prevented from falling out. This results not only in a simplification of the assembly but also in an increase in production reliability.

The housing lid 21 and the spreader frame 23 are otherwise structured similarly to the housing lid 1 from FIG. 1 and the spreader frame 11 from FIG. 2 respectively. In particular, reinforcement ribs 28 and force transducing elements 29 with flow guide surfaces 30 are to be seen in FIG. 3.

Figure 4:
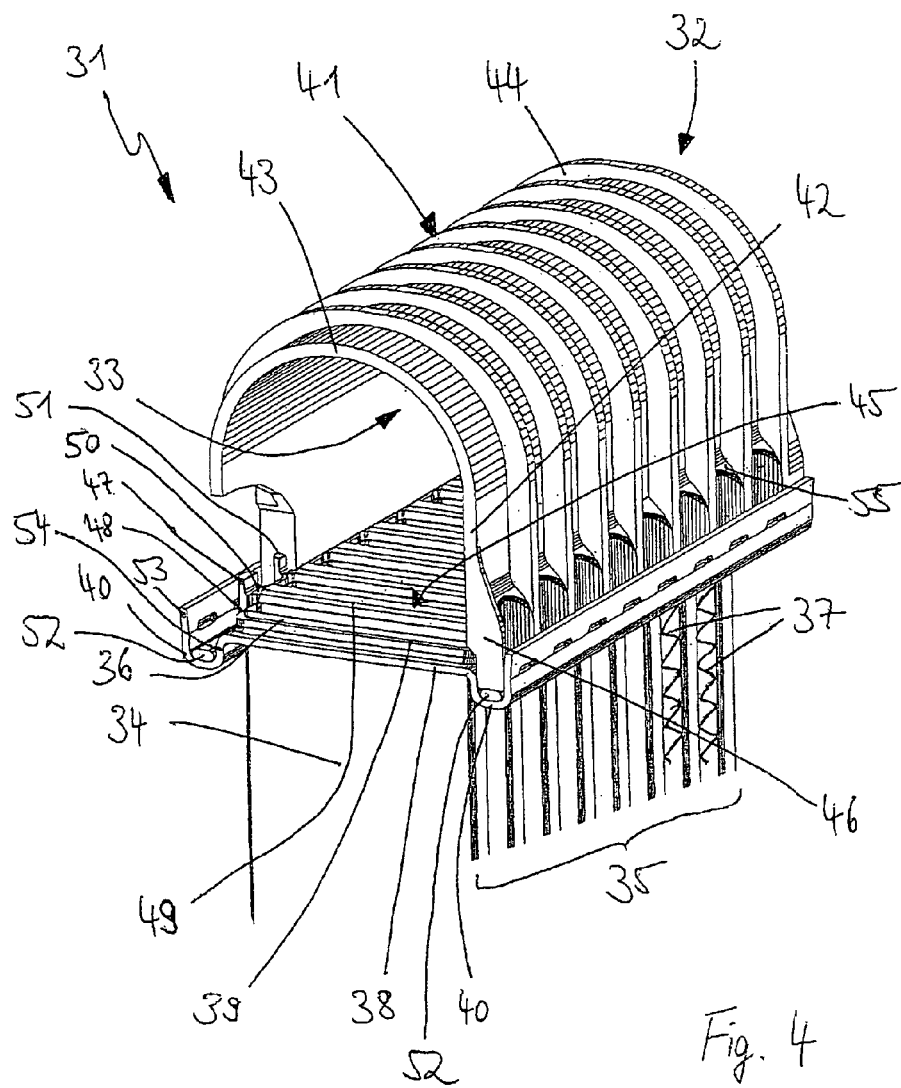
FIG. 4 shows a heat exchanger according to the present invention.

FIG. 4 shows a heat exchanger 31 according to the present invention that can be used, for example, as an intercooler for a motor vehicle. The heat exchanger 31 comprises a box 32 with a chamber 33 for distribution of a flowing medium, for example charge air, to tubes 34 of a tube bundle 35 or for accumulation of a flowing medium from the tubes 34. The tubes 34 communicate for this purpose via their open tube ends 36 with the chamber 33. For an inlet or discharge of the flowing medium, the box 32 preferably has a connecting port (not illustrated) to which a line, for example a pipe or hose, can be connected. The tube bundle 35 furthermore comprises corrugated ribs 37 to increase the heat transmission surface area that are arranged between the tubes 34, preferably connected by bonding to the tubes 34, in particular by soldering, and can be surrounded by a further medium, for example cooling air, so that the medium flowing through the tubes and the medium surrounding the tubes can exchange heat.

The box 32 comprises a tube bottom 38 with in one flat central section openings 39 into which the tube ends 36 are inserted, and in a circumferential section a continuous second receiving element 40 formed as a bead 40. The box 32 furthermore comprises a housing lid 41 with side walls 42 and a top wall 43 provided with continuous reinforcement ribs 44, and with stabilizing elements 45 that connect the side walls 42 together in their edge areas formed as wall bases 46. For a sealed connection between tube bottom 38 and housing lid 41, the wall bases 46 are held in the bead 40 together with a seal 52 that is also preferably continuous and made in one piece and of an elastic material, such as for example rubber. For fixing and compression of the seal 52, the outer edge 53 of the tube bottom can be formed inwards and pressed again the wall bases 46. The tube bottom 38 is preferably made of a metal or an alloy, in particular of aluminum or an aluminum alloy, and has a thickness, for example, of between 1.5 mm and 2.5 mm.

The stabilizing elements 45 comprise first force transmission elements 47, second force transmission elements 48 that are only partially visible and force transducing elements 50 largely hidden by flow guide surfaces 49. The first force transmission elements 47 are held in first receiving elements formed as pockets 51 provided in the side walls 42, while the second force transmission elements 48 engage in the bead 40. Deformation forces occurring in the side walls of the housing lid due to the overpressure of the medium flowing in the chamber 33 are transmitted at least partially via the first receiving elements 51, the first force transmission elements 47, the second force transmission elements 48 and an inner side 54 of the bead 40 into the tube bottom 38 where they are absorbed in the form of compressive forces by its flat central section. The material of the force transmission elements 47, 48 preferably has a higher rigidity than the material of the side walls 42 or of the housing lid 41, so that the force transmission is improved under certain circumstances. A part of the forces is absorbed in the form of tensile forces by the force transducing elements 50 of the stabilizing elements 45 which thus also perform a tie rod function.

The reinforcement ribs 44 that are preferably provided on an outer side of the housing lid 41 and in particular are formed in one piece with the housing lid 41 exhibit a flared profile 55 in the area of the first receiving elements 51. Allowing for the pocket-like recesses created by the first receiving elements 51, this may under certain circumstances provide a more uniform material thickness of the housing lid. Undesirable large accumulations of material are thus avoided.

Figure 5:
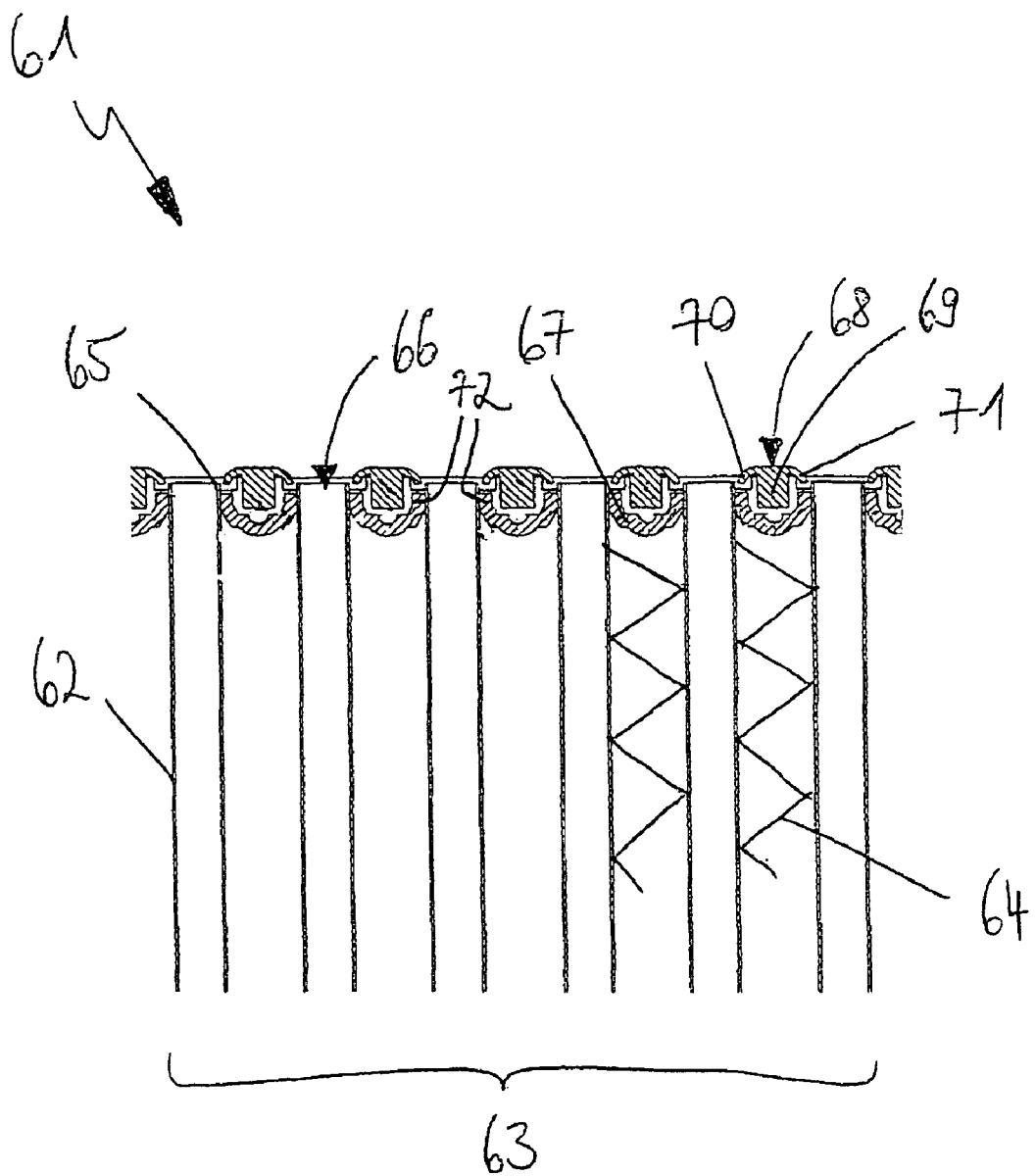
FIG. 5 shows a longitudinal section through a heat exchanger detail.

FIG. 5 shows a detail of a heat exchanger 61 in a longitudinal section. Flat tubes 62 are arranged in a row alternately with corrugated ribs 64 to form a tube bundle 63. The flat tubes 62 are designed here as single-chamber or multi-chamber tubes. Tube ends 65 of the flat tubes 62 are inserted into openings 66 of a tube bottom 67 that forms part of a box (not illustrated in further detail). Stabilizing elements 68 with force transducing elements 69 and flow guide surfaces 70, 71 are arranged between in each case two openings 66 without thereby covering the openings.

In particular between the edges 72 of in each case two openings 66, the tube bottom exhibits recesses that are covered by the flow guide surfaces 70, 71. The flow guide surfaces 70, 71 thereby terminate advantageously at the tubes 62 and are curved towards their walls. This reduces a flow resistance for a medium flowing into the tubes 62 or out of the tubes 62 so that a pressure loss occurring over the whole heat exchanger 61 is also reduced. A collision between the flow guide surfaces 70, 71 with the tube ends 65 of tubes of excess length that may result from manufacturing tolerances is avoided in that the flow guide surfaces 70, 71 adjoin the outer surfaces of the walls of the tubes 62. Tube ends of tubes of excess length extend then under certain circumstances to between the flow guide surfaces of two adjacent stabilizing elements.

In the heat exchanger 61 illustrated in FIG. 5, the flow guide surfaces 70, 71 have essentially the same form with respect to the respective stabilizing element 68 and are arranged symmetrically as a mirror image of one another. Possible advantages of the associated dual symmetry lie, for example, in the improved production reliability. In an embodiment not illustrated, a first flow guide surface (70) of a stabilizing element differs from a second flow guide surface (71) in its geometry, for example in its radius of curvature. In particular in the case of an oriented flow from an inlet port to the openings in the tube bottom or from the openings to an outlet port, a deflection of the flow of the medium on entering and/or leaving the tubes has to be taken into consideration. For an improved reduction in the pressure loss, an asymmetric embodiment or arrangement of the flow guide surfaces is then advantageous.

Figure 6:
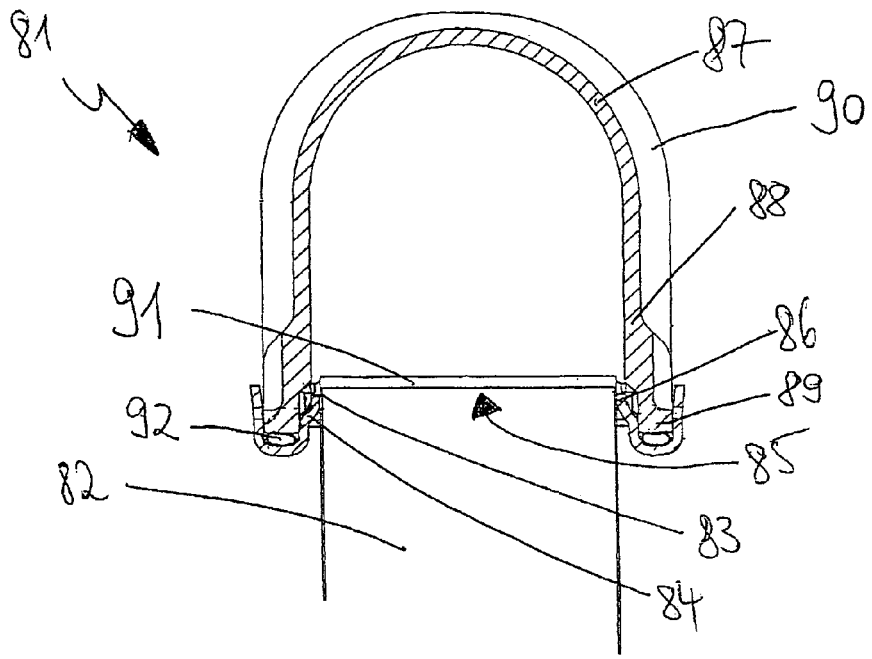
FIG. 6 shows a transverse section through a heat exchanger detail.

FIG. 6 shows a detail of the cross-section of a heat exchanger 81 according to the invention comprising a tube 82 with a tube end 83, a tube bottom 84 with an opening 85 that is limited by an edge 86, a housing lid 87 with side walls 88, wall bases 89 and reinforcement ribs 90, a seal 92 and a stabilizing element 91.

Figure 7:
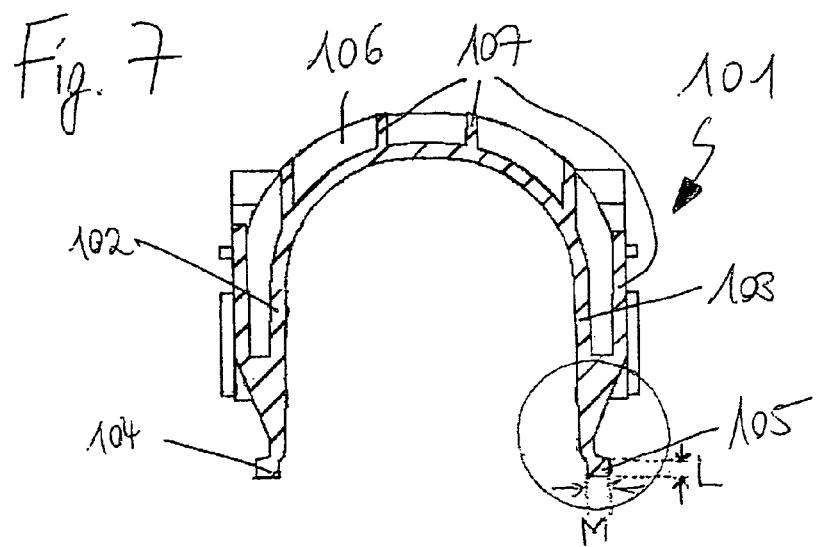
FIG. 7 shows a cross-section through a housing lid.

FIG. 7 shows a cross-section of a variant of a housing lid 101 comprising two opposed side walls 102, 103 with wall bases 104, 105, transverse reinforcement ribs 106 and longitudinal reinforcement ribs 107. The transverse reinforcement ribs 106 serve to stiffen the housing lid 101 against bulging due to internal overpressure, while the longitudinal reinforcement ribs 107 stiffen the housing lid 101 in its longitudinal direction. A thickness M and a height L of the wall bases 104, 105 are both advantageously more than 4 mm.

The invention claimed is:

1. A heat exchanger comprising:
    at least one box comprising at least one chamber for distribution and/or accumulation of a flowing medium and at least one tube bundle that comprises tubes that are in communicating connection with the at least one chamber,
    whereby the at least one box further comprises:
        a tube bottom with openings into which the tubes of the tube bundle can be inserted, and
        a housing lid with at least two side walls and at least one stabilizing element connecting the at least two side walls,
    wherein at least one side wall has at least one first receiving element and the at least one stabilizing element has at least one first force transmission element that can be positively received in the at least one first receiving element of the at least one side wall, and
    wherein the tube bottom of the at least one box has at least one second receiving element formed as a bead and the at least one stabilizing element has at least one second force transmission element that is located inside the bead such that force is transmitted from the at least one second force transmission element to an inner side of the bead and from an inner side of the bead to the tube bottom.

2. The heat exchanger as claimed in claim 1, wherein the at least one first force transmission element is formed in one piece with the at least one second force transmission element.

3. The heat exchanger as claimed in claim 1, wherein the at least one stabilizing element has at least one force transducing element that is essentially arranged between two adjacent openings of the tube bottom.

4. The heat exchanger as claimed in claim 3, wherein the at least one force transducing element is designed to be flexible.

5. The heat exchanger as claimed in claim 3, wherein the at least one force transducing element is formed in one piece with at least one first and/or at least one second force transmission element.

6. The heat exchanger as claimed in claim 1, wherein the at least one stabilizing element has at least one flow guide surface that is essentially connected at least in certain areas to at least one inner or outer surface of a wall of a tube of the tube bundle and/or to at least one inner surface of an edge of an opening in the tube bottom.

7. The heat exchanger as claimed in claim 6, wherein at least in the area of one edge, the at least one flow guide surface is curved towards the at least one inner or outer surface of a tube wall and/or towards the at least one inner surface of the edge of the opening.

8. The heat exchanger as claimed in claim 1, wherein the at least one stabilizing element has a dual rotational symmetry axis with respect to its fundamental components, whereby the rotational symmetry axis is parallel to a longitudinal axis of a tube of the tube bundle.

9. The heat exchanger as claimed in claim 1, wherein the at least one stabilizing element is connected to at least one adjacent stabilizing element by at least one connecting element.

10. The heat exchanger as claimed in claim 9, wherein the at least one connecting element is arranged in an area of a side wall of the housing lid.

11. The heat exchanger as claimed in claim 9, wherein the at least one connecting element is designed to be flexible in at least one direction of expansion due to its material and/or its form.

12. The heat exchanger as claimed in claim 9, wherein the at least one connecting element is formed in one piece with the at least one stabilizing element.

13. The heat exchanger as claimed in claim 9, wherein the at least one connecting element has significantly smaller dimensions than the at least one stabilizing element.

14. The heat exchanger as claimed in claim 1, wherein the housing lid has at least one reinforcing rib at least in an area of a side wall with the at least one first receiving element being arranged in the area of the at least one reinforcing rib.

15. The heat exchanger as claimed in claim 1, wherein at least one side wall of the housing lid has a thickness M with M>4 mm in an edge area facing towards the tube bottom.

16. The heat exchanger as claimed in claim 1, wherein a wall base of at least one side wall of the housing lid has a height L with L>4 mm.

17. The heat exchanger as claimed in claim 1, wherein the first receiving element is a recess formed in the at least one side wall.

18. The heat exchanger as claimed in claim 1, wherein the first force transmission element is located on a top side of the at least one stabilizing element.

19. The heat exchanger as claimed in claim 18, wherein the first force transmission element extends above the at least one stabilizing element.

20. The heat exchanger as claimed in claim 19, wherein the second force transmission element is located on a bottom side of the stabilizing element.

* * * * *